(12) United States Patent
Watanabe et al.

(10) Patent No.: US 6,327,116 B1
(45) Date of Patent: Dec. 4, 2001

(54) THIN FILM MAGNETIC HEAD AND METHOD FOR MAKING THE SAME

(75) Inventors: Toshinori Watanabe; Kiyoshi Sato, both of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/337,603

(22) Filed: Jun. 21, 1999

(30) Foreign Application Priority Data

Jun. 30, 1998 (JP) .................................................. 10-184390
Jul. 9, 1998 (JP) .................................................. 10-194145

(51) Int. Cl.[7] ...................................................... G11B 5/31
(52) U.S. Cl. .............................................................. 360/126
(58) Field of Search ...................................... 360/119, 126

(56) References Cited

U.S. PATENT DOCUMENTS 4,921,508   5/1990   Nonaka .
5,600,519 * 2/1997   Heim et al. .......................... 360/126
5,995,343 * 11/1999  Imamura .............................. 360/126

* cited by examiner

*Primary Examiner*—Robert S. Tupper
(74) *Attorney, Agent, or Firm*—Brinks Hofer Gilson & Lione

(57) ABSTRACT

A thin-film magnetic head has a magnetic lower core layer and a magnetic upper core layer formed on the lower core layer with a nonmagnetic gap layer provided therebetween, and the lower core layer and the upper core layer are opposed on an opposing surface which faces a recording medium. The upper core layer includes a leading region extending from the opposing surface towards the rear portion away from the recording medium and having a track width $T_W$, a middle region extending from the leading region towards the rear portion and having a width larger than the track width $T_W$, and a trailing region extending from the middle region towards the rear portion and having an increasing width. The edges at the boundary between the leading region and the middle region are rounded.

4 Claims, 8 Drawing Sheets

THIN FILM MAGNETIC HEAD AND METHOD FOR MAKING THE SAME

BACKGROUND OF THE INVENTION

1. Field of the Invention

The present invention relates to thin-film magnetic heads provided with a coil layer formed between core layers. In particular, the present invention relates to a thin-film magnetic head which has an upper core layer having an improved shape and can meet trends towards narrow tracks, and relates to a method for making the same.

Also, the present invention relates to a thin-film magnetic head which is provided with a coil layer formed between core layers and has satisfactory NLTS (nonlinear transition shift) characteristics and OW (overwrite) characteristics.

2. Description of the Related Art

Figure 10:
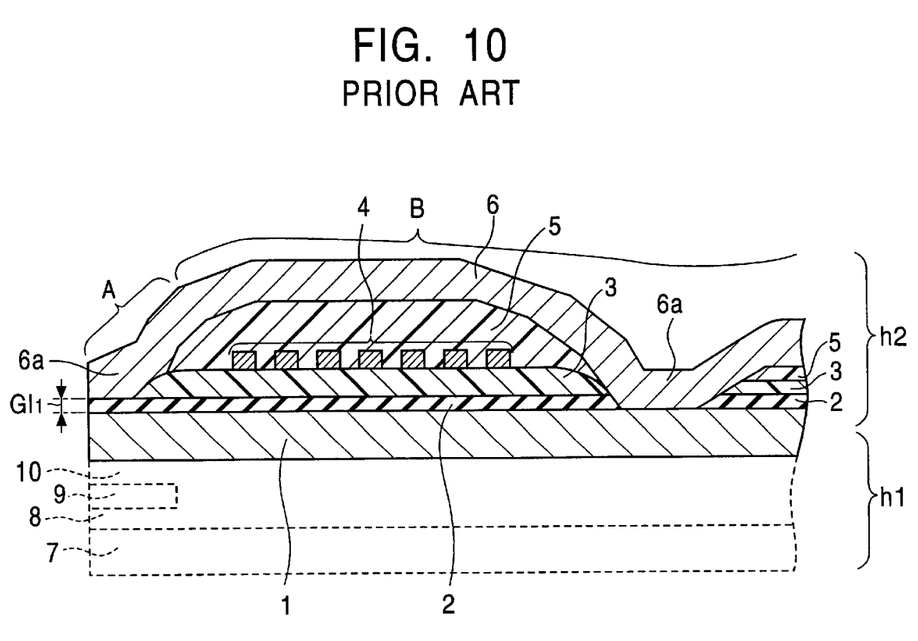
FIG. 10 is a longitudinal cross-sectional view of a conventional thin-film magnetic head.

FIG. 10 is a longitudinal cross-sectional view of a conventional thin-film magnetic head. The left end of the thin-film magnetic head in the drawing faces recording media. This thin-film magnetic head is a so-called "composite thin-film magnetic head" having a reading head h1 using a magnetoresistive effect and an inductive head h2 for writing signals onto recording media, such as a hard disk. The inductive head h2 is deposited on the reading head h1. This thin-film magnetic head is provided at the end of the trailing side of a slider of a floating-type magnetic head.

The reading head h1 has a lower core layer 1 composed of a magnetic material having high permeability, for example, a Fe—Ni alloy (permalloy). The lower core layer 1 also functions as an upper shielding layer of the reading head h1 by means of the magnetoresistive effect.

A gap layer 2 composed of a nonmagnetic material, such as alumina ($Al_2O_3$), is provided on the lower core layer 1. As shown in FIG. 10, an insulating layer 3 composed of a resist or an organic resin is formed on the gap layer 2. Furthermore, a spiral coil layer 4 composed of a highly conductive material such as copper is formed on the insulating layer 3 so as to surround a base section 6b of an upper core layer 6. In FIG. 10, the coil layer 4 can be partially seen.

An insulating layer 5 composed of a resist or an organic resin is formed on the coil layer 4. The upper core layer 6 is formed by plating a magnetic material such as permalloy on the insulating layer 5. A front end section 6a of the upper core layer 6 is bonded to the lower core layer 1 with the gap layer 2 provided therebetween to form a magnetic gap having a gap length $Gl_1$. The base section 6b of the upper core layer 6 is magnetically coupled with the lower core layer 1 through cavities formed in the gap layer 2 and the insulating layer 3.

Figure 11:
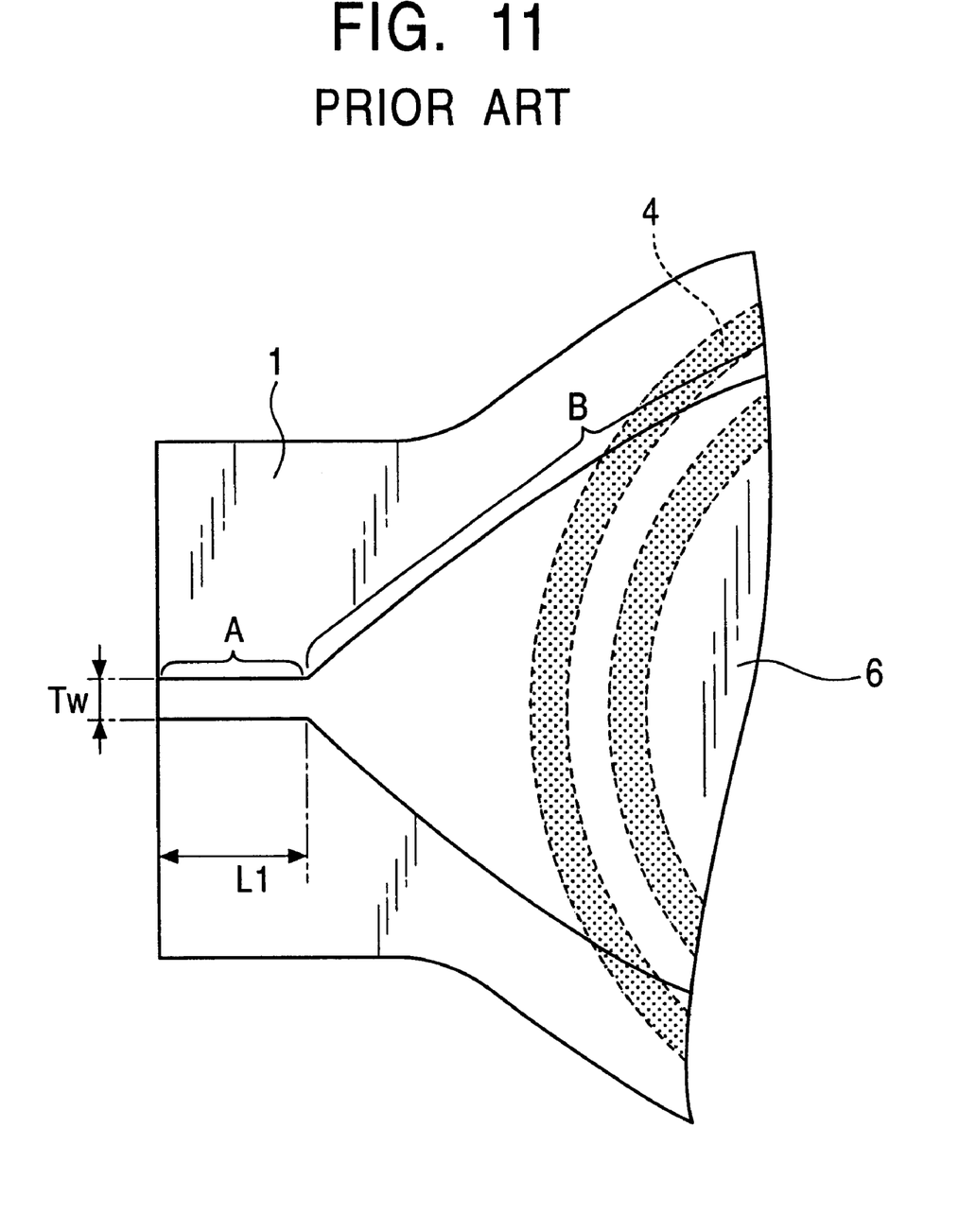
FIG. 11 is a partial plan view of the thin-film magnetic head shown in FIG. 10.

FIG. 11 is a plan view of the thin-film magnetic head shown in FIG. 10. The upper core layer 6 consists of a leading region A having a constant width and a trailing region B gradually spreading from the leading end region. The leading region A of the upper core layer 6 is slender and has a width which is equal to the track width $T_W$.

In the inductive head h2 for writing, recording currents flowing in the coil layer 4 induce recording magnetic fields in the lower core layer 1 and the upper core layer 6. Leakage magnetic fields from the magnetic gap section between the lower core layer 1 and the front end section 6a of the upper core layer 6 record magnetic signals on recording media, such as a hard disk.

As shown in FIG. 10, the reading head h1 includes a lower shielding layer 7 composed of a magnetic material, a magnetoresistive element layer 9 formed on the lower shielding layer 7 with a lower gap layer 8 provided therebetween 8, and an upper shielding layer or lower core layer 1 formed on the magnetoresistive element layer 9 with an upper gap layer 10 provided therebetween.

NLTS characteristics and OW characteristics, as important recording characteristics, greatly depend on the shape of the leading region A of the upper core layer 6. Herein, the NLTS (nonlinear transition shift) characteristics mean the phase lead caused by non-linear distortion of the leakage magnetic field, generated in the magnetic gap between the upper core layers 1 and the lower core layer 6 of the inductive head h2 in FIG. 10 by the leakage magnetic field from the magnetic recording signals which are just recorded on a recording medium towards the head.

The OW (overwrite) characteristics mean a difference in output of recorded signals at a low frequency between the initial output before overwriting at a high frequency and the decreased output after the overwriting.

When the leading region A of the upper core layer 6 is slender, as shown in FIG. 11, the length L1 of the leading region A is considered to be preferably in a range of approximately 4 $\mu$m to 10 $\mu$m. Such a length L1, however, causes deterioration of OW characteristics although it contributes to improvement in NLTS characteristics.

Figure 12:
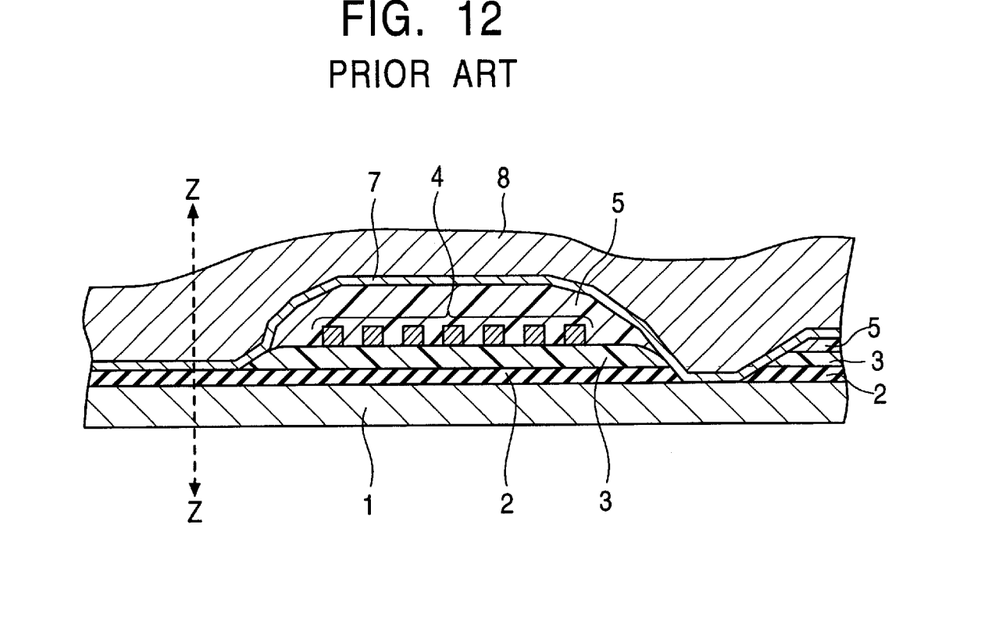
FIG. 12 is a longitudinal cross-sectional view showing a step for forming an upper core layer of a conventional thin-film magnetic head.

The upper core layer 6 of the thin-film magnetic head is formed by a frame plating process, as shown in FIG. 12. In this process, the coil layer 4 is formed and is covered with the insulating layer 5. An underlying layer 7 composed of a magnetic material such as a NiFe alloy is formed over the gap layer 2, exposed in the vicinity of the end, and the insulating layer 5. After a resist layer 8 is formed on the underlying layer 7, the resist layer 8 is exposed and developed to form a pattern of the shape of the upper core layer 6. A magnetic layer (upper core layer 6) is plated on the exposed underlying layer 7. The residual resist layer 8 is removed to form the upper core layer 6. The thin-film composite is cut along line Z—Z in FIG. 12 to form the thin-film magnetic head shown in FIG. 10, wherein the cut surface along line Z—Z faces the recording media.

Figure 13:
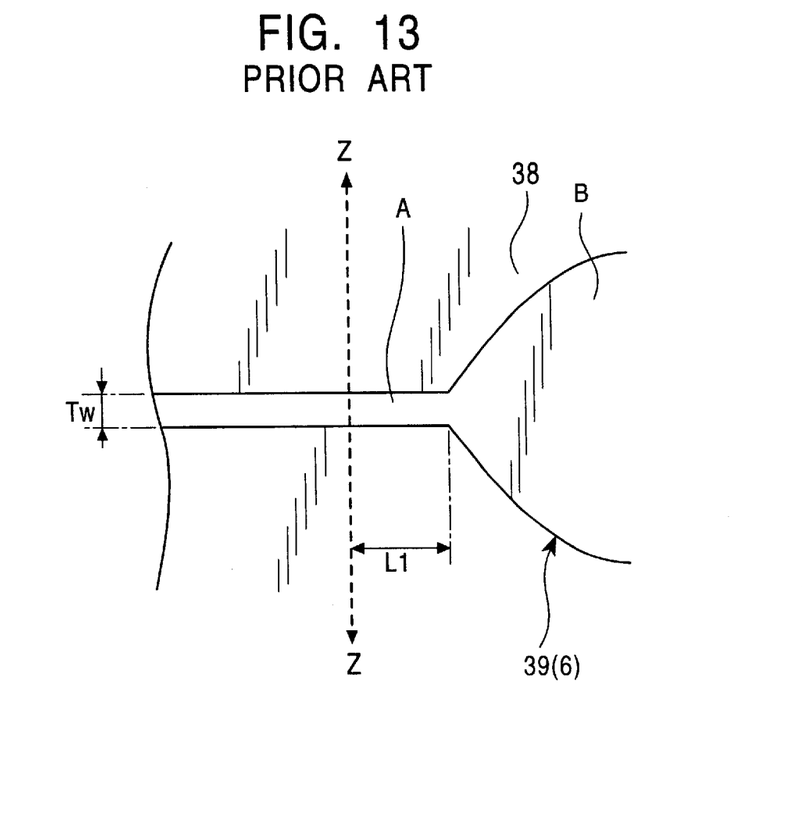
FIG. 13 is a partial plan view of a conventional pattern of an upper core layer formed in a resist layer.

Production of the upper core layer 6 of a conventional thin-film magnetic head has the following problems. FIG. 13 is a plan view when a resist layer 38 is formed on the underlying layer 7 and a pattern 39 of the upper core layer 6 is formed on the resist layer 38. As shown in FIG. 13, the pattern 39 of the upper core layer 6 consists of the leading region A having a track width $T_W$ at the left side in the drawing and the trailing region B spreading towards the right side. The current track width $T_W$, approximately 2 to 3 $\mu$m, of the leading region A must be decreased to 1 $\mu$m or less in order to meet current high-density recording trends.

The pattern 39 is formed by exposing and developing the resist layer 38. In conventional processes, the slender leading region A and the spreading trailing region B are simultaneously exposed using short-wavelength light (g-line to i-line) at a low NA (numerical aperture) of 0.2 to 0.3 for achieving a large depth of focus. For example, the upper limit of the resolution is 1.0 $\mu$m for a combination of the i-line and a numerical aperture NA of 0.2 to 0.3. Thus, a track width $T_W$ of less than 1.0 $\mu$m is not achieved in conventional processes.

When the resist layer 38 on the leading region A is removed in the development step after the formation of the pattern 39 for the upper core layer 6, a developing solution barely penetrates into the resist layer 38 in the pattern 39 for the slender leading region A having a small width (track width $T_W$). Thus, the resist layer 38 in the leading region A may be not completely removed. Accordingly, this process is not applicable to an upper core layer having a smaller track width $T_W$.

In addition, the leading region A of the resulting thin-film magnetic head has a small track width $T_W$ and a large length $L_1$. Thus, OW characteristics are decreased by damping of the magnetic flux density in the leading region A. It is known that the OW characteristics of the upper core layer 6 having the leading region A with the track width $T_W$ decrease as the length L1 of the leading region A increases.

SUMMARY OF THE INVENTION

It is an object of the present invention to provide a thin-film magnetic head having an improved leading edge of an upper core layer to meet narrow track width requirement without deterioration of OW characteristics and to provide a method for making the thin-film magnetic head.

It is another object of the present invention to provide a thin-film magnetic head having an improved leading edge of an upper core layer to improve OW characteristics while maintaining satisfactory NLTS characteristics.

In accordance with a first aspect of the present invention, a thin-film magnetic head includes a lower core layer composed of a magnetic material and an upper core layer composed of a magnetic material formed on the lower core layer with a nonmagnetic gap layer formed therebetween, wherein the lower core layer and the upper core layer are opposed on an opposing surface facing a recording medium. The upper core layer consists of a leading region extending from the opposing surface towards the rear portion away from the recording medium and having a track width $T_W$, a middle region extending from the leading region towards the rear portion and having a width larger than the track width $T_W$, and a trailing region extending from the middle region towards the rear portion and having an increasing width. Furthermore the edges at the boundary between the leading region and the middle region are rounded.

In accordance with a second aspect of the present invention, a thin-film magnetic head includes a lower core layer and an upper core layer composed of a magnetic material, and a coil layer provided between the lower core layer and the upper core layer for inducing a recording magnetic field to the lower core layer and the upper core layer. The upper core layer consists of a leading region extending from an opposing surface facing a recording medium towards the rear portion away from the recording medium and having a constant track width, a middle region extending from the leading region to the rear portion and having an increasing width, the edges of the middle region having an angle of θ1 with respect to the edges of the leading region, and a trailing region extending from the middle region towards the rear portion and having an increasing width, the edges of the trailing region having an angle of θ2 with respect to the edges of the leading region.

Preferably, the angle θ2 of the edges of the trailing region is larger than the angle θ1 of the edges of the middle region.

Preferably, the angle θ1 of the edges of the middle region is in a range of 5° to 30°.

In accordance with a third aspect of the present invention, in a method for making a thin-film magnetic head including a magnetic lower core layer, a nonmagnetic gap layer formed on the lower core layer, and a magnetic upper core layer formed on the gap layer, the method includes the steps of forming the gap layer on the lower core layer, forming a coil layer on the gap layer at a position behind an opposing surface facing a recording medium, and then forming an insulating layer on the coil layer; forming a magnetic underlying layer over the gap layer exposed in the vicinity of the opposing surface to the insulating layer at the rear portion, and then forming a resist layer on the underlying layer; forming, by an exposing and developing process, a pattern for a middle region of the upper core layer in the resist layer lying at a region towards the rear portion with a given distance from the opposing surface, the middle region having a constant width larger than the track width, and a pattern for a trailing region lying towards the rear portion, the trailing region having an increasing width towards the rear portion, and simultaneously forming a pattern for a dummy region in the resist layer lying at a region towards the front section with a given distance from the opposing surface, the dummy region having a width larger than the track width; forming, by an exposing and developing process, a pattern for a leading region of the upper core layer in the resist layer between the pattern for the middle region and the pattern for the dummy region, the leading region having a constant width smaller than the width of the dummy region so that the pattern for the leading region connects the pattern for the middle region and the pattern for the dummy region; forming a magnetic layer in the patterns for the leading region, the middle region, the trailing region and the dummy region by a plating process, and then removing the residual resist layer; and removing the magnetic layer formed in the pattern for the dummy region and the magnetic layer formed in the pattern for the leading region lying in front of the opposing surface to expose the leading region, having the track width $T_W$, of the upper core layer.

Preferably, the numerical aperture NA when the pattern for the leading region of the upper core layer is exposed is higher than the numerical aperture NA when the patterns for the middle region and the trailing region of the upper core layer and the pattern for the dummy region are exposed.

DESCRIPTION OF THE PREFERRED EMBODIMENT

Figure 1:
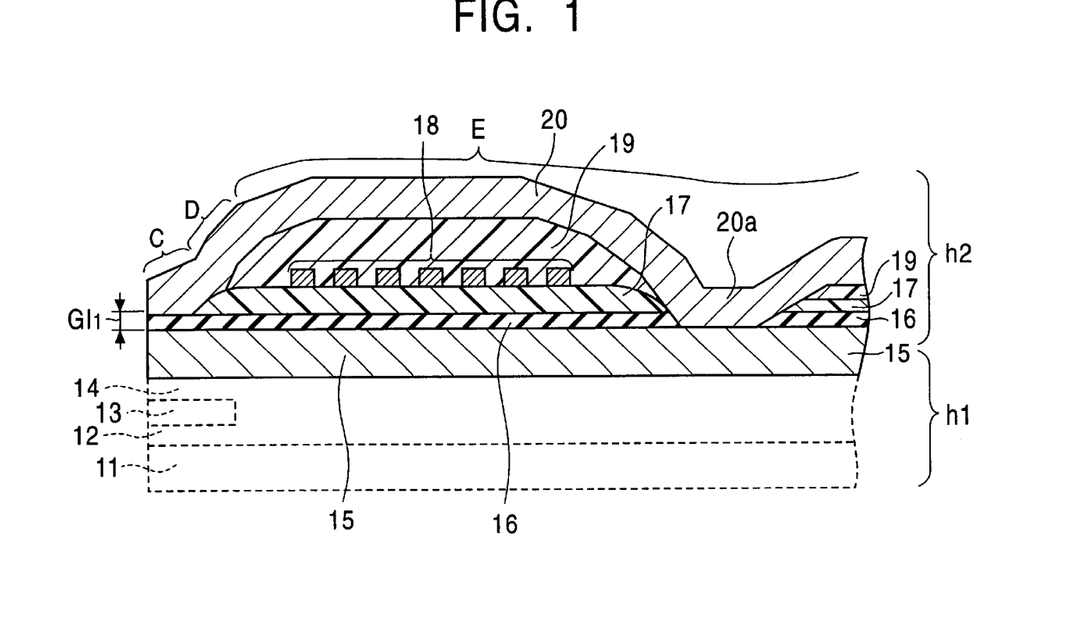
FIG. 1 is a longitudinal cross-sectional view of a thin-film magnetic head according to an embodiment of the present invention.
Figure 2:
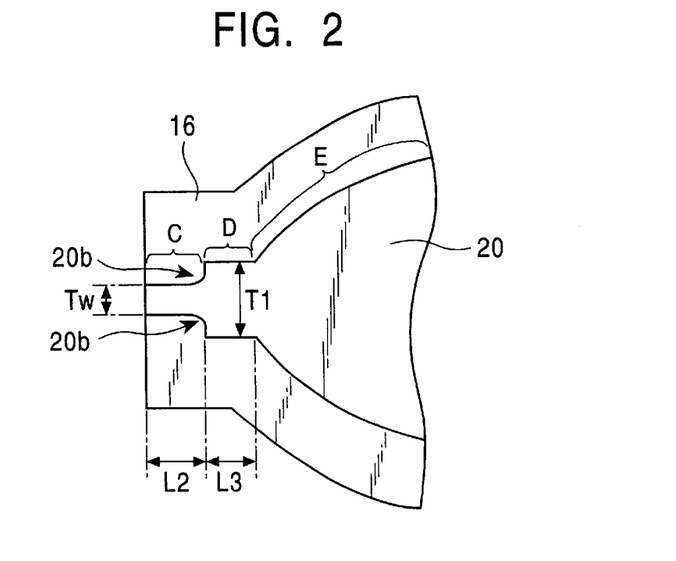
FIG. 2 is a partial plan view of an upper core layer in accordance with the present invention.

FIG. 1 shows a longitudinal cross-sectional view of a thin-film magnetic head in a first embodiment of the present invention, and FIG. 2 is a plan view of the thin-film magnetic head. The thin-film magnetic head is provided at the trailing-end face of a slider which is a constituent of a floating-type magnetic head. The thin-film magnetic head is a magnetoresistive(MR)/inductive composite thin-film magnetic head consisting of a reading head h1 and an inductive writing head h2. In FIGS. 1 and 2, the left end of the thin-film magnetic head functions as an air bearing surface which faces a recording medium.

The reading head h1 detects a leakage magnetic field as recording signals from the recording medium, such as a hard disk, by means of a magnetoresistive effect. A lower shielding layer 11 composed of a soft magnetic material is formed at the trailing-end face of the slider. A lower gap layer 12 composed of a nonmagnetic material, e.g., alumina ($Al_2O_3$), is formed on the lower shielding layer 11, and a magnetoresistive element layer 13 is formed thereon. The magnetoresistive element layer 13 has an AMR (anisotropic magnetoresistive) or GMR (giant magnetoresistive) structure. An upper gap layer 14 composed of a nonmagnetic material is provided on the magnetoresistive element layer 13 and an upper shielding layer 15 composed of a soft magnetic material, such as a NiFe alloy, is provided thereon. Thus, the reading head h1 has a composite structure including the lower shielding layer 11 to upper shielding layer 15. In the present invention, the upper shielding layer 15 also functions as a lower core layer at the reading side of the inductive writing head h2.

A gap layer 16 composed of a nonmagnetic material, such as alumina, is formed on the lower core layer (upper shielding layer) 15. Also, an insulating layer 17 composed of a polyimide or resist is formed on the gap layer 16, and a flat coil layer 18 having a spiral pattern is formed thereon. The coil layer 18 is composed of a nonmagnetic conductive material having low electrical resistance, such as copper. The coil layer 18 is embedded with an insulating layer 19 composed of a polyimide or resist. An upper core layer 20 composed of a soft magnetic material is formed on the insulating layer 19. The upper core layer 20 functions as a trailing-side core section of the inductive writing head h2.

With reference to FIG. 2, the upper core layer 20 consists of a leading region C having a track width $T_W$, a middle region D having a width T1 which is larger than the track width $T_W$, and a trailing region E which extends from the middle region D towards the rear portion. The leading region C has a length L2 and the middle region D has a length L3.

With reference to FIG. 1, at the surface facing the recording medium in the leading region C, the upper core layer 20 lies above the upper shielding layer 15 with the gap layer 16 therebetween to form a magnetic gap $Gl_1$ for applying a magnetic field to the recording medium. A base 20a of the upper core layer 20 is magnetically coupled with the upper shielding layer 15.

As described above, in this embodiment the length L2 (refer to FIG. 2) the leading region C of the upper core layer 20 is smaller than the length L1 (refer to FIG. 13) of the leading region A of the conventional thin-film magnetic head, and the middle region D having a width T1 and a larger cross-sectional area is formed behind the leading region C having a track width $T_W$ and a smaller cross-sectional area. Since such a configuration can suppress magnetic saturation in the vicinity of the upper core layer 20 and thus damping of magnetic flux density, OW characteristics can be improved. In addition, this configuration facilitates the formation of a leading region C having a smaller track width $T_W$ of less than 1.0 µm so that the thin-film magnetic head can meet future high-density recording requirements.

As shown in FIG. 2, edges at a boundary 20b between the leading region C and the middle region D of the upper core layer 20 are rounded to facilitate the flow of the magnetic flux. As a result, the leakage magnetic flux is reduced and thus OW characteristics are improved. The rounded edges are spontaneously formed during the formation of the leading region C by a patterning process in a method in accordance with the present invention.

Figure 3:
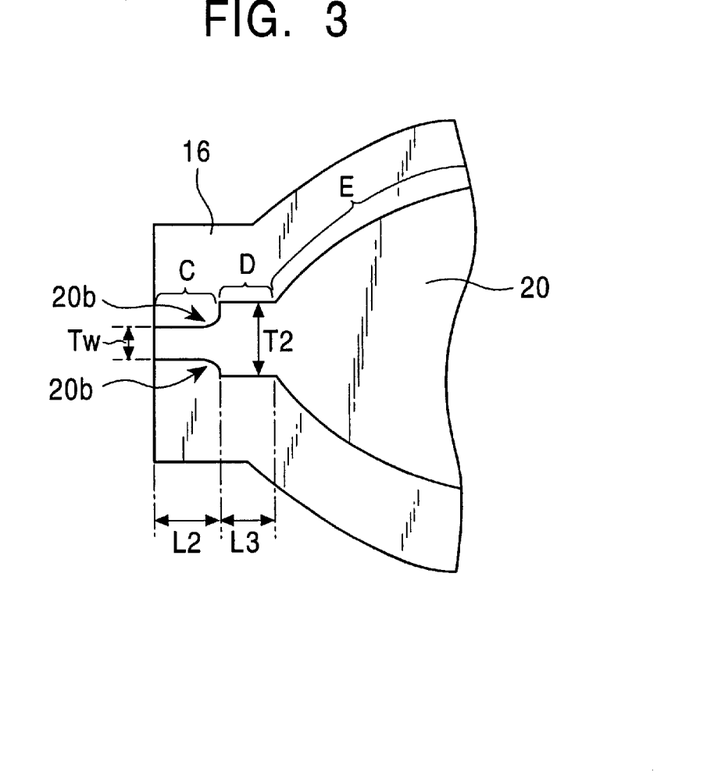
FIG. 3 is a partial plan view of another upper core layer in accordance with the present invention.

FIG. 3 is a plan view of another upper core layer 20 in accordance with the present invention. In this embodiment, only one edge of the middle region D is expanded with respect to the leading region C, and the middle region D has a width T2. The edge at the expanded boundary 20b is also rounded.

The method for making the thin-film magnetic head in accordance with the present invention will now be described with reference to FIGS. 4 to 7.

Figure 4:
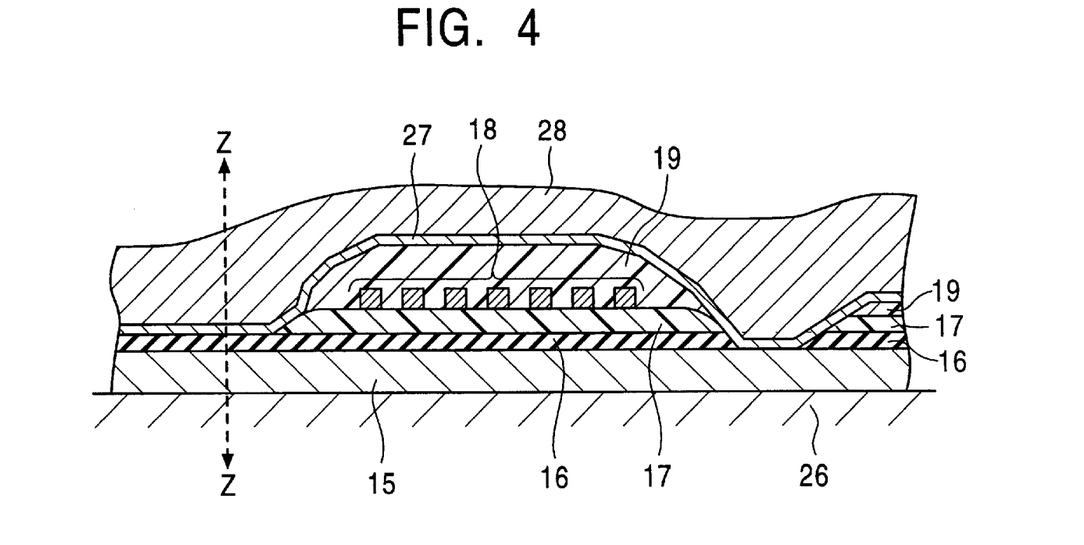
FIG. 4 is a longitudinal cross-sectional view showing a step for forming an upper core layer of a thin-film magnetic head.

With reference to FIG. 4, the lower core layer 15 is formed on a substrate 26 provided with the reading head h1. The lower core layer 15 is formed so as to extend to the left side of a surface position shown by line Z—Z which will be a surface facing a recording medium. The nonmagnetic gap layer 16 is formed on the lower core layer 15.

Next, the insulating layer 17 composed of an organic material or the like is formed on the gap layer 16 from the surface position to the base end (at the right in the drawing), wherein an interval is provided between the surface position and the insulating layer 17. The flat coil layer 18 having a spiral pattern composed of a nonmagnetic conductive material such as copper is formed on the insulating layer 17 by a patterning process. Also, the organic insulating layer 19 is formed on the coil layer 18.

Next, the upper core layer 20 (refer to FIG. 1) is formed by a frame plating process over the exposed section at the left side of the gap layer 16 to the insulating layer 19. An underlying layer 27 is formed using a magnetic material such as permalloy over the gap layer 16 and the insulating layer 19, and a resist layer 28 is formed on the underlying layer 27.

Figure 5:
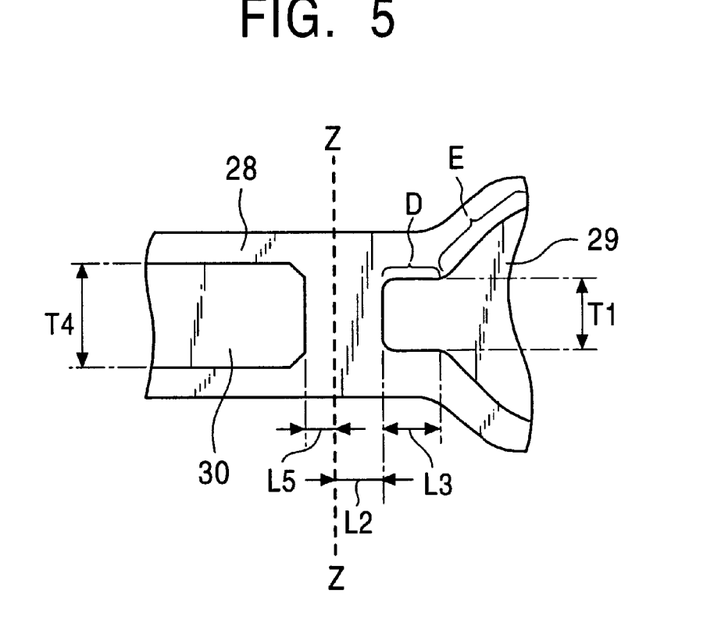
FIGS. 5 to 7 are partial plan views showing steps for forming an upper core layer.
Figure 6:
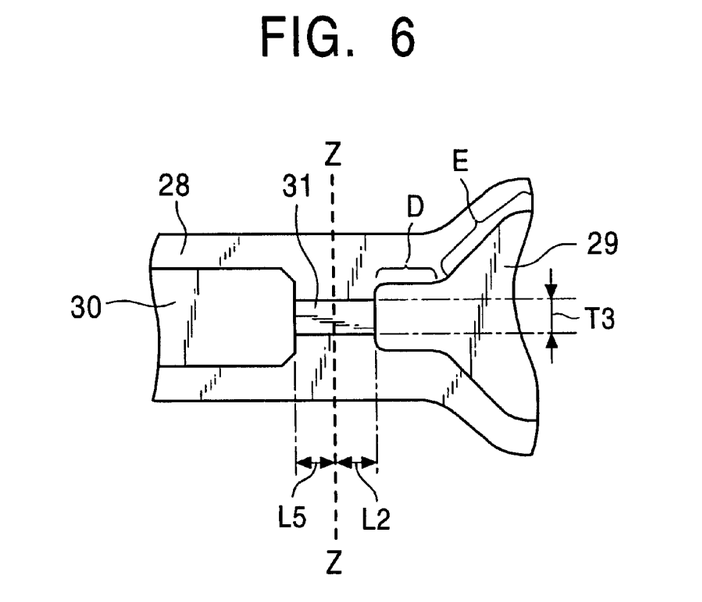
Figure 7:
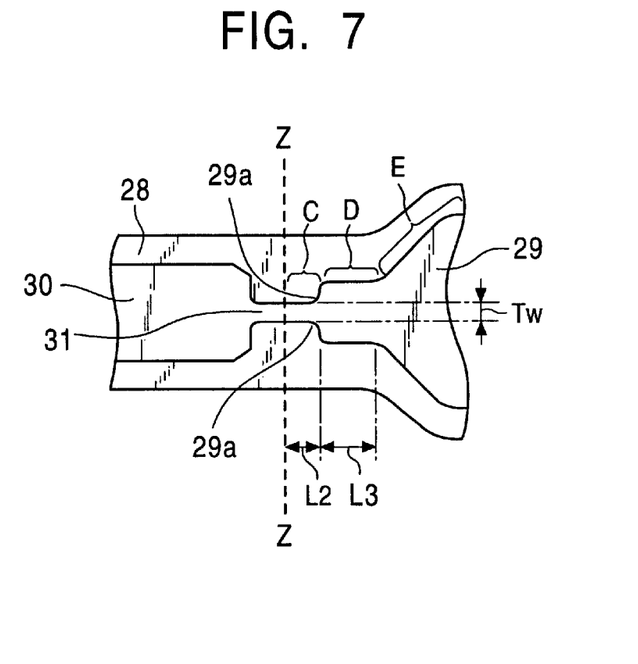

FIGS. 5 to 7 show the steps for forming the pattern of the upper core layer 20 which is formed on the resist layer 28.

With reference to FIG. 5, a pattern 29 is formed in the resist layer 28 at the right (rear) section with a distance L2 from the surface portion (line Z—Z) in the drawing by a photolithographic process. This pattern 29 includes a segment for forming the middle region D having a width T1 larger than the track width $T_W$ and a length L3 and another segment for forming the trailing region E having a width which gradually increases towards the rear portion. Simultaneously, a dummy pattern 30 for forming a dummy region is formed in the resist layer 28 at the left side with a distance L5 from the surface portion (line Z—Z). The dummy pattern 30 has a width T4 which is larger than the track width $T_W$.

These patterns 29 and 30 can be exposed at a conventional numerical aperture NA of 0.2 to 0.3. Such a low numerical aperture NA has a large depth of focus and a low resolution. Since the insulating layer 19 protrudes under the resist layer 28 (refer to FIG. 4), the resist layer 28 is partially uneven in thickness. The pattern 29 tends to spread at such portions by partial defocusing. Thus, the pattern 29 is not precisely formed according to a predetermined shape. In the middle region D and the trailing region E, which are formed of the pattern 29, the widths are remarkably larger than the track width $T_W$. Hence, it is unnecessary to precisely form the pattern 29 compared to the pattern 30 for the leading region C. Thus, the pattern 29 can be exposed at a conventional numerical aperture NA.

With reference now to FIG. 6, a pattern 31 having a width T3 is exposed in the resist layer 28 between the pattern 29 and the pattern 30. Thus, the pattern 31 has a length L2+L5. The right section of the pattern 31 having a length L2 will become the leading region C of the upper core layer 20. The pattern 31 is exposed at a higher numerical aperture NA in a range of approximately 0.4 to 0.6 or higher resolution compared with that for the patterns 29 and 30. Thus, the width T3 of the pattern 31 can be decreased to, for example, less than 1.0 μm, which is not achieved by a conventional process.

When the pattern 29 is formed and then the pattern 31 is exposed so that the pattern 31 adjoins the pattern 29, edges at the boundary between the pattern 31 and the pattern 29 are spontaneously rounded during the subsequent development step for the pattern 31, and the developed pattern 31 has a width which is smaller than the width T3 before development. In the present invention, therefore, the exposed width T3 of the pattern 31 is slightly larger than the track width $T_W$ so that the width of the pattern 31 after development is equal to the track width $T_W$. The resist layer 28 of the pattern 31 is removed with a developing solution.

The wide patterns 29 and 30 are formed on the two sides of the exposed pattern 31 with a narrow width T3. When the resist layer 28 in the pattern 31 is removed with a developing solution, the developing solution can rapidly penetrate into the resist layer 28 in the pattern 31 through the positions of the patterns 29 and 30. As a result, the resist layer 28 is readily removed.

FIG. 7 shows a state after removal of the resist layer 28 in the pattern 31. The edges 29a and 29a at the boundary between the developed pattern 31 and the pattern 29 are rounded, and the width of the pattern 31 is smaller than the exposed width T3 and is equal to the track width $T_W$.

A magnetic layer is formed in the patterns 29, 30 and 31 by plating and then the residual resist layer 28 is removed. The magnetic layer formed in the patterns 30 and 31 at the left of the surface (line Z—Z) facing a magnetic medium is removed to form the upper core layer 20. The resulting upper core layer 20 has the exposed leading region C having a constant track width $T_W$ as a surface facing a recording medium.

Figure 8:
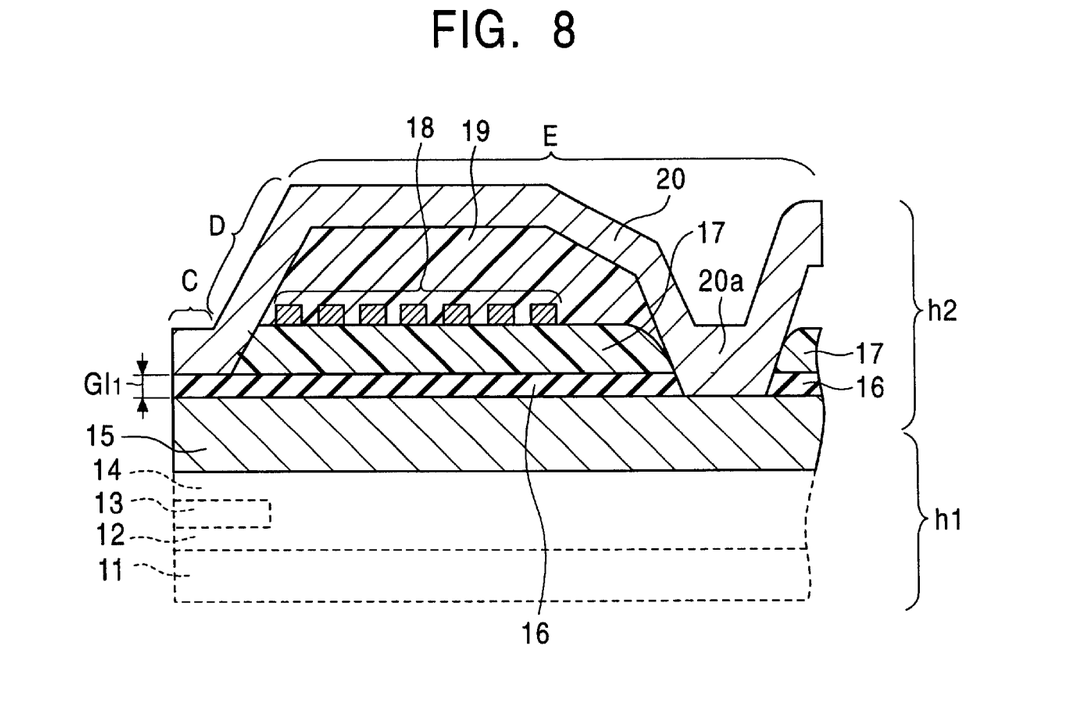
FIG. 8 is a longitudinal cross-sectional view of a thin-film magnetic head according to an embodiment of the present invention.
Figure 9:
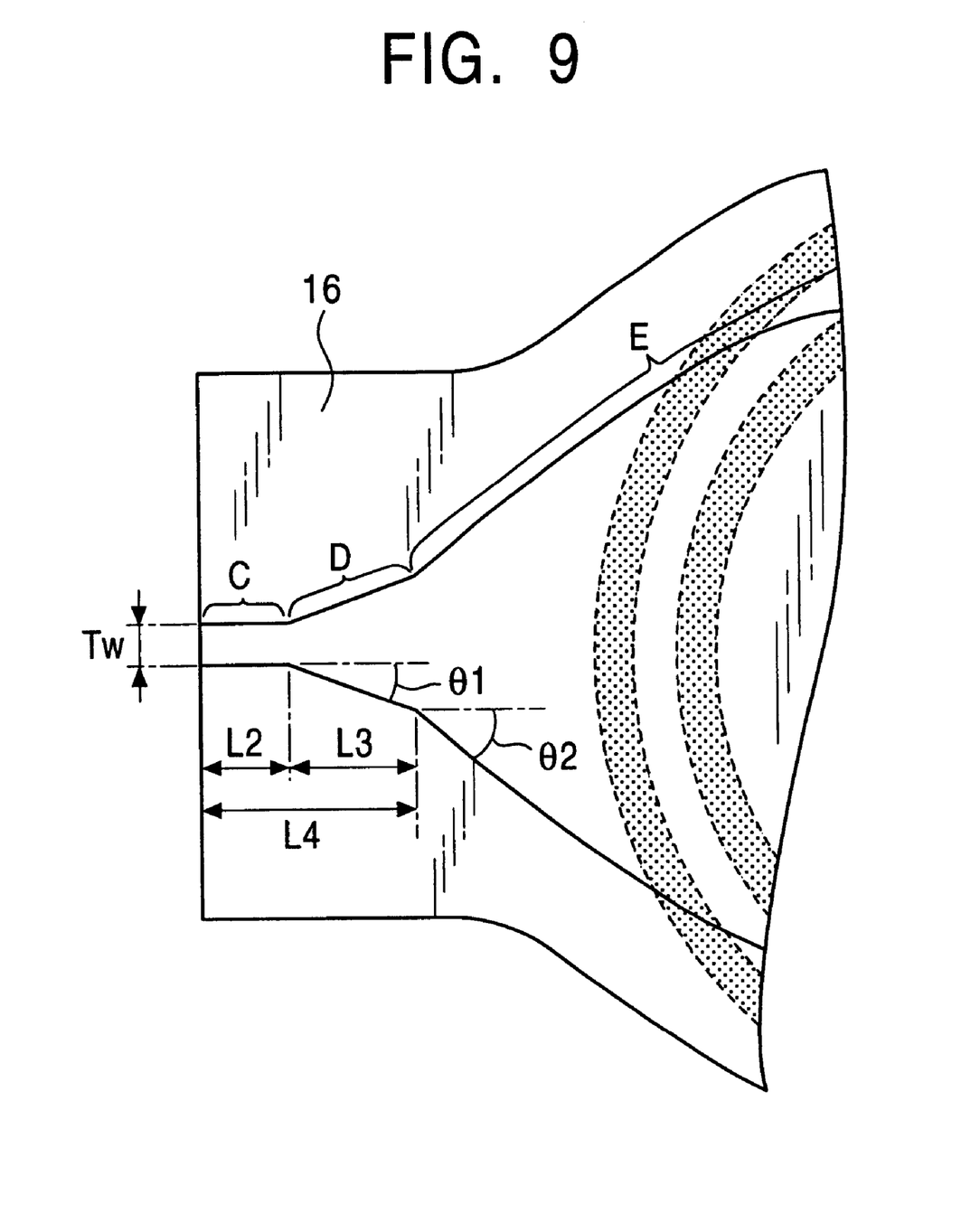
FIG. 9 is a partial plan view of the thin-film magnetic head shown in FIG. 8.

FIG. 8 is a longitudinal cross-sectional view of a thin-film magnetic head in accordance with a second embodiment of the present invention, and FIG. 9 is a plan view of the thin-film magnetic head shown in FIG. 8. The left side of the thin-film magnetic head functions as a recording-medium-opposing surface in these drawings.

The thin-film magnetic head is provided at the trailing-end face of a slider which is a constituent of a floating-type magnetic head. The thin-film magnetic head is a magnetoresistive(MR)/inductive composite thin-film magnetic head consisting of a reading head h1 and an inductive writing head h2.

The reading head h1 detects a leakage magnetic field as recorded signals from a recording medium, such as a hard disk, by means of a magnetoresistive effect. A lower shielding layer 11 composed of a soft magnetic material is formed at the trailing-end face of the slider. A lower gap layer 12 composed of a nonmagnetic material, e.g., alumina ($Al_2O_3$), is formed on the lower shielding layer 11, and a magnetoresistive element layer 13 is formed thereon. The magnetoresistive element layer 13 has an AMR (anisotropic magnetoresistive) or GMR (giant magnetoresistive) structure. An upper gap layer 14 composed of a nonmagnetic material is provided on the magnetoresistive element layer 13 and an upper shielding layer 15 composed of a soft magnetic material, such as a NiFe alloy, is provided thereon. Thus, the reading head h1 has a composite structure including the lower shielding layer 11 to upper shielding layer 15. In the present invention, the upper shielding layer 15 also functions as a leading-side or lower core layer of the inductive writing head h2.

A gap layer 16 composed of a nonmagnetic material, such as alumina, is formed on the lower core layer (upper shielding layer) 15. Also, an insulating layer 17 composed of a polyimide or resist is formed on the gap layer 16, and a flat coil layer 18 having a spiral pattern is formed thereon. The coil layer 18 is composed of a nonmagnetic conductive material having low electrical resistance, such as copper. The coil layer 18 is embedded with an insulating layer 19 composed of a polyimide or resist. An upper core layer 20 composed of a soft magnetic material is formed on the insulating layer 19. The upper core layer 20 functions as a trailing-side core section of the inductive writing head h2.

With reference to FIG. 9, the upper core layer 20 consists of a leading region C having a constant width (track width $T_W$), a middle region D having a moderately increasing width towards the rear portion, and a trailing region E behind the middle region D. Two edges of the middle region D have an angle θ1 with respect to the edges of the leading region C, whereas two edges of the trailing region E have an angle θ2 with respect to the edges of the leading region C.

With reference to FIG. 8, at the surface facing the recording medium in the leading region C, the upper core layer 20 lies above the upper shielding layer 15 with the gap layer 16 therebetween to form a magnetic gap $Gl_1$ for applying a magnetic field to the recording medium. A base 20a of the upper core layer 20 is magnetically coupled with the upper shielding layer 15.

The particular configurations of the leading region C and the middle region D contribute to improvement in NLTS and OW characteristics.

With reference to FIG. 9, in the upper core layer 20, the length L2 of the leading region C is smaller than the length L1 of the leading region A of the conventional thin-film magnetic head shown in FIG. 11. That is, the length L1 lies in a range of 4 μm to 10 μm, whereas the length L2 in this embodiment is preferably 3 μm or less. Furthermore, the total length L4 of the length L2 of the leading region C and the L3 of the middle region D is preferably 4 μm or more.

It is preferable that the angle θ2 of the trailing region E be larger than the angle θ1 of the middle region D. In other words, it is preferable that the trailing region E be formed so that the width gradually increases from the middle region D to the rear portion. Preferably, the angle θ1 of the edge of the middle region D lies in a range of 5° to 30°.

As described above, in this embodiment the length L2 (refer to FIG. 9) of the leading region C of the upper core layer 20 is decreased, and the width of the middle region D is moderately increased towards the rear portion to increase the cross-sectional area. Since such a configuration can suppress magnetic saturation in the vicinity of the upper core layer 20, OW characteristics can be improved. As described above, the angle θ1 of the edges of the middle region D is 5° or more. An angle θ1 less than 5° provides a substantially straight middle region D. Thus, the slender section including the leading region C and the middle region D has a small cross-sectional area causing deterioration of OW characteristics.

In the upper core layer 20 in this embodiment, the total length L4 of the length L2 of the leading region C and the L3 of the middle region D is substantially equal to or larger than the length of the leading region A of the upper core layer of the conventional thin-film magnetic head shown in FIG. 11, and the angle θ1 of the edges of the middle region D is 30° or less, in order to achieve satisfactory NLTS characteristics.

When a leakage magnetic field from a recording medium magnetizes the recording core, it is preferable that the magnetic field generated from the gap of the magnetized core, that is, the demagnetizing field, be small in order to improve the NLTS characteristics. In this embodiment, the middle region D of the upper core layer 20 is provided behind the middle region C and has a gradually increasing width towards the rear portion. Such a configuration can effectively suppress the demagnetizing field and thus can maintain satisfactory NLTS characteristics which are comparable to that of the conventional thin-film magnetic head shown in FIG. 11.

As described above, the upper core layer of the present invention consists of a leading region having a track width $T_W$, a middle region having a width larger than the track width $T_W$, and a trailing region having an increasing width towards the rear portion. In addition, the length of the leading region is decreased. Such a configuration can suppress damping of the magnetic flux density in the vicinity of the front end of the upper core layer, and thus can improve OW characteristics.

Since the leading region of the upper core layer can be readily formed to a desirable track width $T_W$, for example, less than 1 μm, the thin-film magnetic head can satisfy trends towards narrowing track widths.

The patterns for the middle and trailing regions are formed, and then the pattern of the leading region of the upper core layer is formed at a numerical aperture NA which is higher than that of the middle and trailing regions. Thus, the pattern for the leading region can be formed with high resolution.

Alternatively, the upper core layer consists of a leading region having a narrow constant width, a middle region having a width which gradually increases towards the rear portion, and a trailing region having a width which further increases towards the rear portion. Such a configuration can effectively suppress magnetization saturation and thus damping of the magnetic flux density, resulting in improved OW characteristics.

In the present invention, the angle θ1 of the middle region is suppressed and the total length of the leading region and the middle region is equal to or greater than the length of the leading region of a conventional upper core layer. Such a configuration can maintain satisfactory NLTS characteristics.

What is claimed is:

1. A thin-film magnetic head comprising:

a lower core layer comprising a magnetic material; and an upper core layer comprising a magnetic material formed on the lower core layer with a nonmagnetic gap layer formed therebetween, the lower core layer and the upper core layer being opposed on an opposing surface facing a recording medium;

wherein the upper core layer comprises a leading region extending from the opposing surface towards a rear portion away from the recording medium and having a track width $T_W$, a middle region extending from the leading region towards the rear portion and having a constant width that is larger than the track width $T_W$, and a trailing region extending from the middle region towards the rear portion and having an increasing width, the edges at a boundary between the leading region and the middle region being rounded.

2. The thin-film magnetic head according to claim 1, further comprising a reading head.

3. The thin-film magnetic head according to claim 1, wherein the rounded edges at the boundary between the leading region and the middle region each comprise a 90° arc, the arc having a first end that is parallel with the edge of the leading region and a second end that is perpendicular with the edge of the middle region.

4. The thin-film magnetic head according to claim 1, wherein the width of the trailing region is defined by convex edges.

* * * * *

UNITED STATES PATENT AND TRADEMARK OFFICE
CERTIFICATE OF CORRECTION

PATENT NO. : 6,327,116 B1
DATED : December 4, 2001
INVENTOR(S) : Kiyoshi Sato

It is certified that error appears in the above-identified patent and that said Letters Patent is hereby corrected as shown below:

<u>Title page,</u>
Item [12], delete "Watanabe et al." and substitute -- Sato -- in its place.
Item [75], delete "Toshinori Watanabe; Kiyoshi Sato, both of"
and substitute -- Kiyoshi Sato, -- in its place.

Signed and Sealed this

Twenty-seventh Day of May, 2003

JAMES E. ROGAN
*Director of the United States Patent and Trademark Office*